C. A. GILSON.
SLIDE RULE.
APPLICATION FILED MAY 9, 1914.

1,157,526.

Patented Oct. 19, 1915.
3 SHEETS—SHEET 1.

Witnesses
Edw. S. Hall.
W. E. Walk Jr.

Inventor
Clair A. Gilson.

By Richard Owen.
Attorney

C. A. GILSON.
SLIDE RULE.
APPLICATION FILED MAY 9, 1914.
1,157,526.
Patented Oct. 19, 1915.
3 SHEETS—SHEET 3.
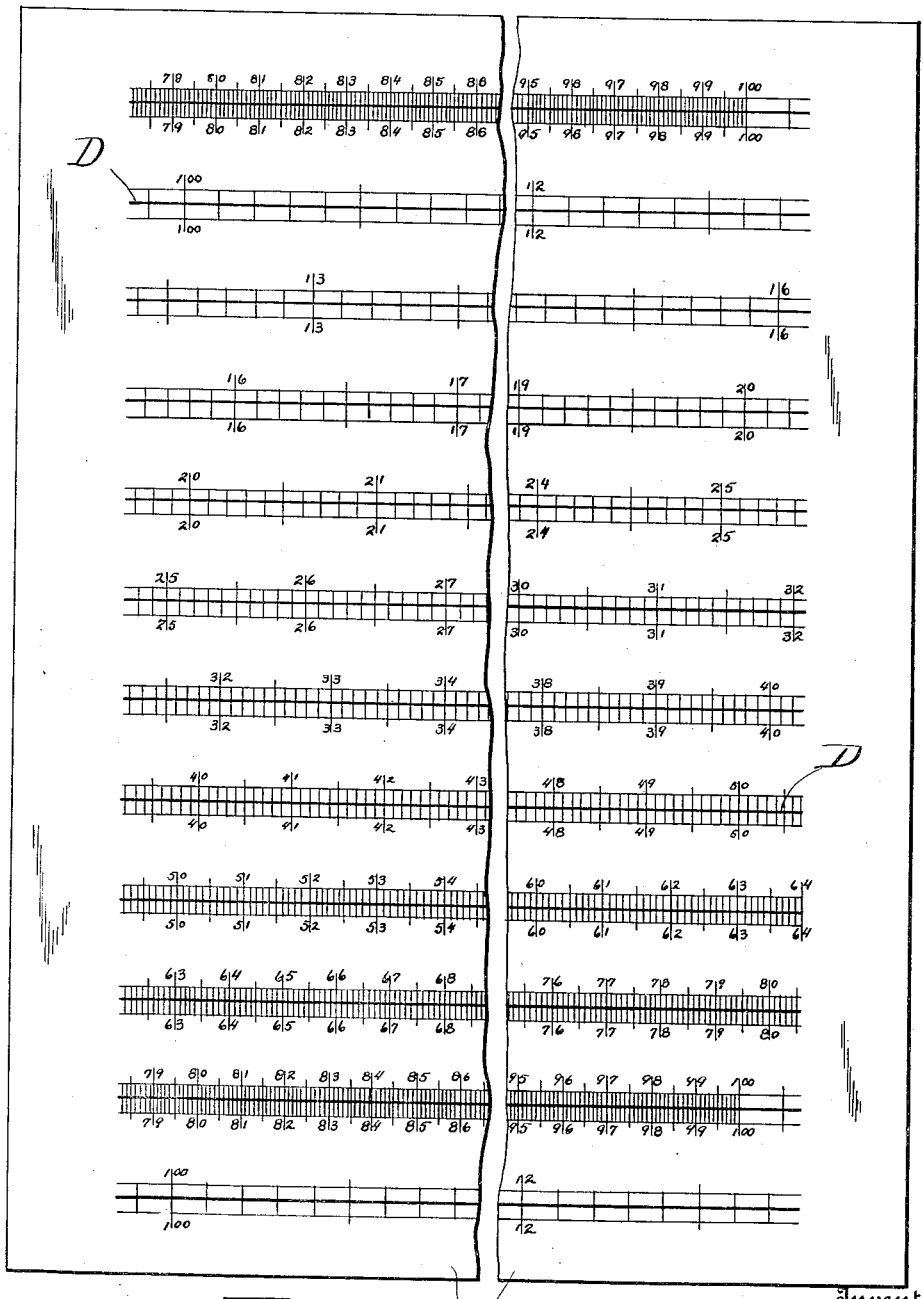

UNITED STATES PATENT OFFICE.

CLAIR A. GILSON, OF NILES, MICHIGAN.

SLIDE-RULE.

1,157,526.      Specification of Letters Patent.      Patented Oct. 19, 1915.

Application filed May 9, 1914. Serial No. 837,506.

*To all whom it may concern:*

Be it known that I, CLAIR A. GILSON, a citizen of the United States, residing at Niles, in the county of Berrien and State of Michigan, have invented certain new and useful Improvements in Slide-Rules, of which the following is a specification.

My invention relates to improvements in slide rules, and as its primary object contemplates the use of a flat scale sheet and a coöperating flat slide sheet, the latter being horizontally slotted to make visible the indicating numerals upon the scale sheet over which it is slid.

As a further object, the invention contemplates a scale sheet upon which numerals are so arranged relatively to the co-acting slide as to provide for movement of the latter in such a novel and peculiar manner as to permit of calculation generally.

The above and additional objects are accomplished by such means as are illustrated in their preferred embodiment in the accompanying drawings, described in the following specification and then more particularly pointed out in the claims which are appended hereto and form a part of this application.

In describing my invention in detail reference will be had to the accompanying drawings wherein like characters denote like or corresponding parts throughout the several views, and in which:—

Figure 1:
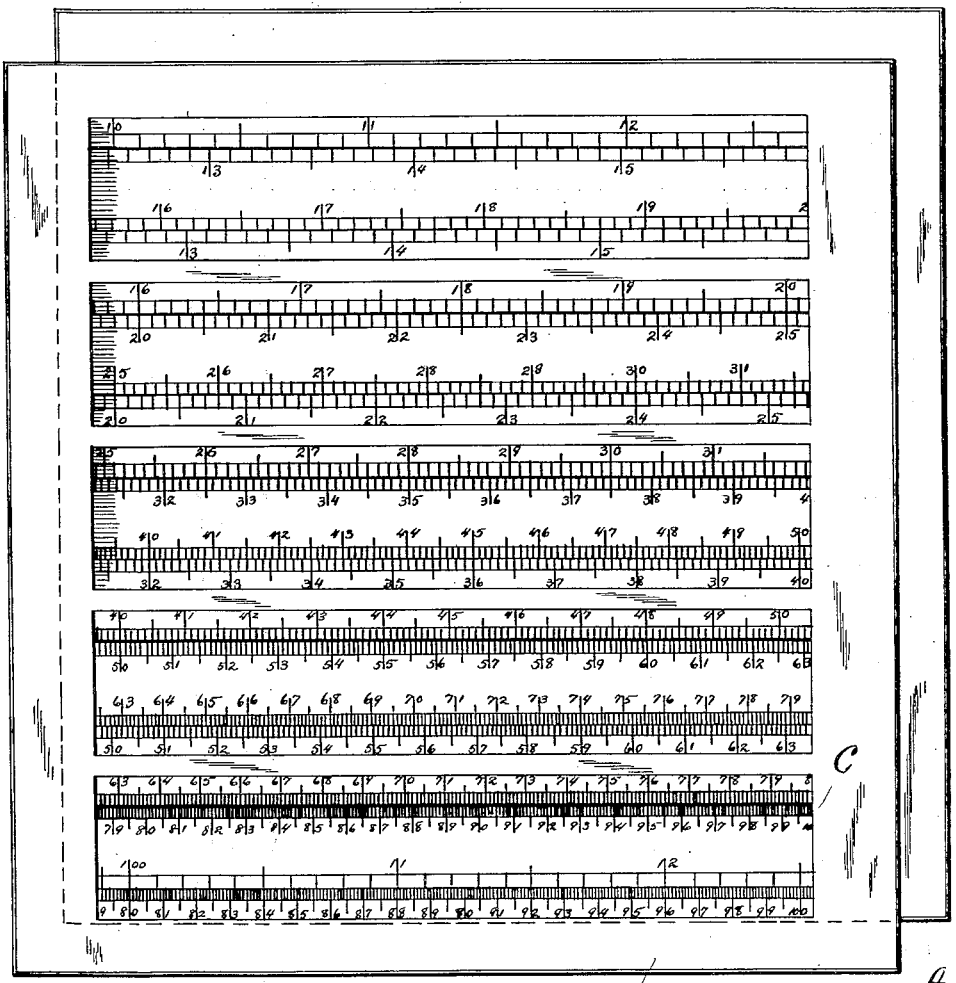
Figure 2:
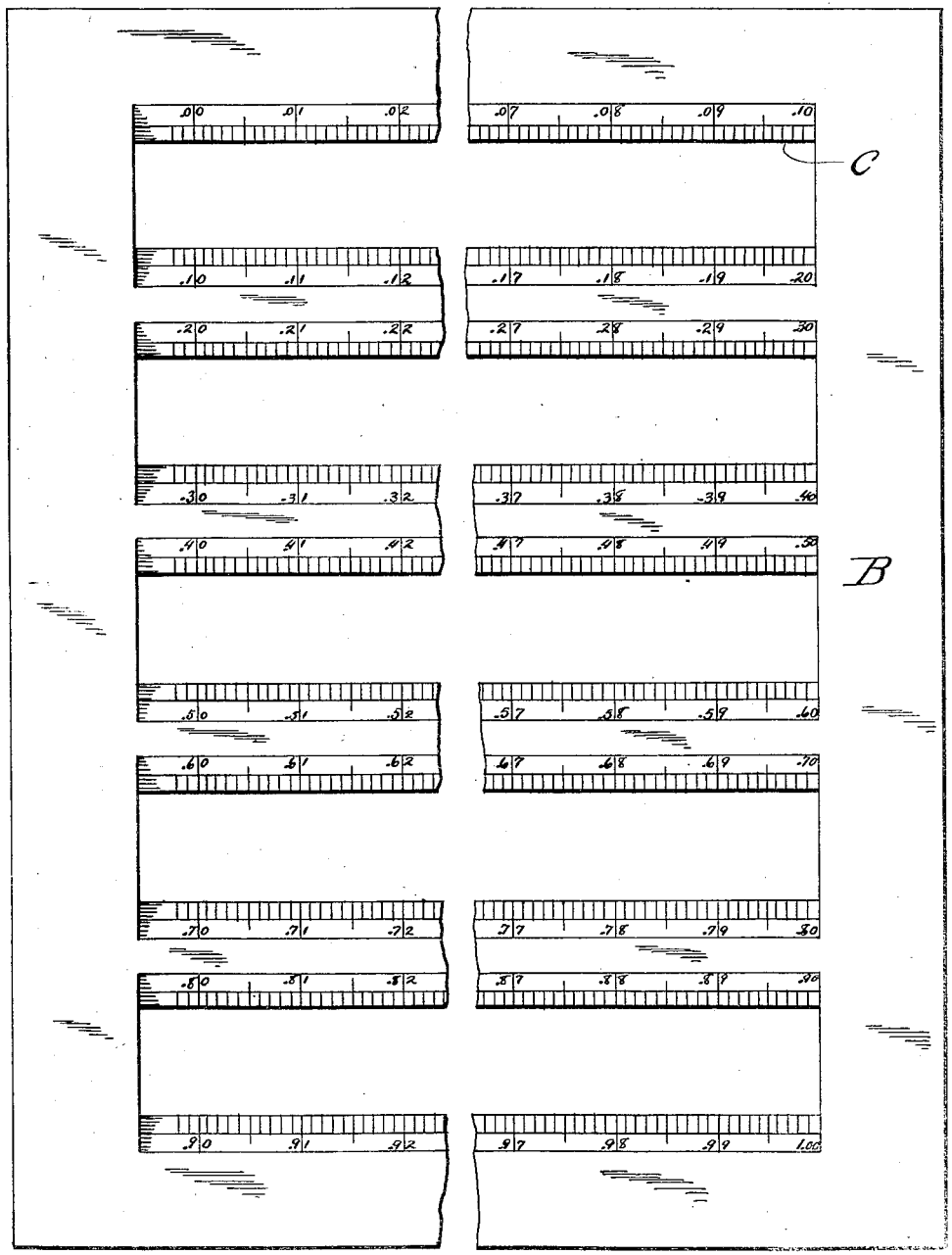

Figure 1 is a face view illustrating the manner in which the scale sheet and slide sheet are arranged relatively to each other when calculating; Fig. 2 is a face view of the slide sheet, partly broken away, illustrating the arrangement of the numerals upon the said sheet on the opposite side from that illustrated in Fig. 1; and Fig. 3 is a face view of the scale sheet, partly broken away.

Referring now to the drawings in detail, A designates the scale sheet and B the slide, the latter being provided with a plurality of horizontally extending uniformly spaced parallel slots C formed therein, the respective longitudinal edges of the slots upon one face of the slide B being graduated, from 10 to 100, the graduations beginning at the upper edge of the uppermost slot and decreasing gradually.

The scale sheet A, illustrated to advantage in Fig. 3, has numerals ranging from 1 to 100 thereupon in such a novel and peculiar manner as to provide for the arrangement of the numeral "100" adjacent each of the respective four corners of the sheet, this arrangement of the numerals providing for unlimited calculation and increasing materially the scope of usefulness of the device. As illustrated in said Fig. 3, and beginning with the second horizontal line of graduating marks, the numerals increase in denomination and the graduation marks decrease proportionately, the numeral 100 being at the end of the second line from the bottom of the sheet as shown. By this arrangement, it is apparent that the numeral 100 is disposed at two of the respective four corners of the sheet. By the provision of an additional line of graduation marks, one at the top and one at the bottom of the sheet, the one at the top being in duplicate to the one next to the bottom of the sheet, and the one at the bottom being in duplicate to the one next to the top of the sheet, it is apparent that 100 is disposed adjacent the two remaining corners of the sheet whereby calculation is facilitated to a material extent and in a manner to be hereinafter fully described.

The numerals upon the scale sheet are arranged upon each side of a dividing line designated D, the numerals registering, that is, being the same above as below the dividing line. Upon the slide sheet, the numerals increase in denomination and the graduation marks decrease proportionately as the numerals progress from the top edge of the uppermost slot to the bottom edge of the lowermost slot as shown.

Example: By placing the slide sheet upon the scale sheet as shown in Fig. 1, the numeral 8 of the slide sheet is made to register with the numeral 100 upon the scale sheet, and the bottom edge of the lowermost slot being alined with the dividing line D of the lowermost row of numerals and graduations upon the scale A, it is apparent that any calculation of the numeral 8 may be determined. For instance, when it is desired that 8 be multiplied by 12, first aline the numeral 8 with any one of the four hundreds upon the scale sheet, next locate the numeral 12 upon the scale sheet, and the numeral upon the slide sheet directly adjacent the numeral 12 upon the scale sheet will be the result of the multiplication (96, as shown). Further example: 8 multiplied by 110

47 equals 376, this result being determined upon application to the calculating device wherein it is apparent that 376 is the result. By reference first, to the numeral 47 upon the scale sheet and then to the numeral adjacent thereto upon the slide, which number in the present instance is 37, this giving the first two numbers of the result, and, as 47 is six points to the right of the numeral 37 upon the slide, the numeral 6 is the third number of the result.

It is to be remembered that one of the numerals acted upon must be made to register with one of the one hundreds of the scale sheet to provide for the determining of the proper result when multiplied, the one hundred to be used being determined by the relative arrangement of the sheet, it being best to so arrange the slide upon the scale sheet as to position the two as near as possible one directly above the other.

To divide, for instance, 8 into 24, eight of the slide sheets should be first made to register with one of the one hundreds upon the scale sheet, in which event, the numeral acted upon (24) will have directly adjacent thereto upon the scale sheet the divisor, namely 3. Where odd numbers are used, the result may equally as well be obtained, for example, 8 into 47 goes 5 times with 7 left over, the result being apparent upon the scale sheet by alining the numeral 8 with one of the one hundreds, next finding the numeral 47 upon the slide, and the numeral adjacent the said numeral 47 will be the answer, which, as is apparent upon reference to Fig. 1, is 5.87.

To find the logarithm of any number, place "0.0" of the slide sheet, as illustrated in Fig. 2, on 100 of scale sheet and 100 of the slide sheet on 100 of the scale sheet, then the logarithm of any number on the scale sheet is read directly adjacent on the slide sheet: Thus—the logarithm of 2 (on the scale sheet) is .3010 (on the slide sheet), and by prefixing the correct characteristic, logarithm 20 equals 1.3010; logarithm 0.2 equals .3010.

From the foregoing, taken in connection with the accompanying drawings it is apparent that rapid calculation is made possible by the arrangement of the numerals upon the respective sheets as shown; that the logarithm of any number may be readily determined by arranging the scale sheet directly beneath the slide sheet, that face of the slide sheet shown in Fig. 2 being visible; and that by the arrangement of the numeral 100 in the respective four corners of the scale sheet, the scope of usefulness of the device is materially increased.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claims.

Having thus fully described my invention, what I claim as new and desire to secure by Letters Patent, is:—

1. In a calculating device, a scale having numerals arranged thereon in rows, the numerals in the row next lowermost being a duplicate of the numerals in the row uppermost, and vice versa, and a slide shiftable over the mentioned scale to coöperate with the numerals thereon, substantially as described.

2. In a calculating device, a scale sheet having numerals arranged thereon in rows, the numerals in the row lowermost being a duplicate of the numerals in the row next uppermost and vice versa, and a slide sheet shiftable over said scale sheet, said slide sheet being provided with openings to expose the numerals on the scale sheet to view, said slide sheet being further provided with numerals adjacent said opening for coöperation with the numerals on the scale sheet, substantially as described.

3. In a calculating device, a scale sheet having numerals thereon arranged in rows, the numerals in the uppermost row being reproduced in the row next lowermost, and the numerals in the lowermost row being reproduced in the row next uppermost, and a slide sheet shiftable over the scale sheet, said slide sheet being provided with openings through which the numerals on the scale sheet are visible, the relative arrangement of the slide sheet upon the scale sheet being adapted to provide for calculation generally in the manner specified.

In testimony whereof I affix my signature in presence of two witnesses.

CLAIR A. GILSON.

Witnesses:
 LENA LARDNER,
 N. H. BACON.